(12) United States Patent
Neidenberger et al.

(10) Patent No.: US 11,052,729 B2
(45) Date of Patent: Jul. 6, 2021

(54) BURNER AND VEHICLE HEATER

(71) Applicant: Webasto SE, Stockdorf (DE)

(72) Inventors: Peter Neidenberger, Stockdorf (DE); Paul Leinsle, Stockdorf (DE); Vitali Dell, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 105 days.

(21) Appl. No.: 16/317,611

(22) PCT Filed: Jul. 18, 2017

(86) PCT No.: PCT/EP2017/068127
§ 371 (c)(1),
(2) Date: Jan. 14, 2019

(87) PCT Pub. No.: WO2018/015385
PCT Pub. Date: Jan. 25, 2018

(65) Prior Publication Data
US 2019/0232758 A1 Aug. 1, 2019

(30) Foreign Application Priority Data

Jul. 18, 2016 (DE) ...................... 10 2016 113 222.5

(51) Int. Cl.
*B60H 1/22* (2006.01)
*F23D 11/40* (2006.01)
*F23C 7/00* (2006.01)

(52) U.S. Cl.
CPC ......... *B60H 1/2212* (2013.01); *B60H 1/2206* (2013.01); *F23D 11/40* (2013.01);
(Continued)

(58) Field of Classification Search
CPC .. B60H 1/2212; B60H 1/2206; B60H 1/2203; B60H 2001/2281; B60H 2001/2284;
(Continued)

(56) References Cited

U.S. PATENT DOCUMENTS 2,727,568 A * 12/1955 Smith ..................... F23N 5/085
431/29
3,082,813 A * 3/1963 Hamelink ................ F23N 5/22
431/26
(Continued)

FOREIGN PATENT DOCUMENTS

DE 2802543 A1 7/1979
DE 3501719 A1 1/1986
(Continued)

OTHER PUBLICATIONS

"DE_2802543_A_M—Machine Translation.pdf", machine translation, EPO.org, Aug. 30, 2020. (Year: 2020).*

*Primary Examiner* — Daniel E. Namay
(74) *Attorney, Agent, or Firm* — Quarles & Brady LLP

(57) ABSTRACT

A burner (10), particularly for vehicle heaters, includes a flexible panel (12) that separates an inner combustion region (14) from an outer region (16). A light-sensitive sensor for flame recognition is arranged in the outer region (16), and the flexible panel (12) includes at least one light opening (20) that allows the passage of light from the inner combustion region (14) into the outer region (16). The light opening (20) also allows the passage of combustion air from the outer region (16) into the inner combustion region (14).

8 Claims, 3 Drawing Sheets

(52) U.S. Cl.
CPC .... *F23D 11/404* (2013.01); *B60H 2001/2281* (2013.01); *B60H 2001/2284* (2013.01); *F23D 2900/21002* (2013.01); *F23N 2229/00* (2020.01)

(58) Field of Classification Search
CPC ............. B60H 2001/2271; F23D 11/40; F23D 11/404; F23D 2900/21002; F23D 14/725; F23D 2208/10; F23N 2229/00; F23N 2241/14; F23C 7/00; F23L 1/02
USPC ............................ 237/12.3 C; 431/79, 13, 69
See application file for complete search history.

(56) References Cited

U.S. PATENT DOCUMENTS

| | | | | |
|---|---|---|---|---|
| 3,205,359 A | * | 9/1965 | Giuffrida | F23N 5/082 340/578 |
| 3,501,257 A | * | 3/1970 | Hebert | B60K 11/02 431/347 |
| 3,689,773 A | * | 9/1972 | Wheeler | F23N 5/082 250/554 |
| 3,852,022 A | * | 12/1974 | Medeot | F23D 11/40 431/186 |
| 3,902,841 A | * | 9/1975 | Horn | F23N 5/242 431/79 |
| 3,922,137 A | * | 11/1975 | Peczeli | F23C 7/004 431/183 |
| 4,532,914 A | * | 8/1985 | Thomas | F23N 5/025 126/110 C |
| 4,595,356 A | * | 6/1986 | Gaysert | B60H 1/2203 237/12.3 C |
| 4,629,414 A | * | 12/1986 | Buschulte | F23D 11/40 431/116 |
| 4,976,463 A | * | 12/1990 | Soo | B60H 1/2209 237/12.3 B |
| 5,139,412 A | * | 8/1992 | Kychakoff | F23N 5/082 431/12 |
| 5,370,526 A | * | 12/1994 | Buschulte | F23C 9/006 431/116 |
| 5,681,159 A | * | 10/1997 | Benedek | F23C 7/00 126/115 |
| 6,244,856 B1 | * | 6/2001 | Winnington | F23D 14/14 126/92 C |
| 2003/0175637 A1 | * | 9/2003 | Stephens | F23C 6/045 431/9 |
| 2005/0181319 A1 | * | 8/2005 | Tamura | F23C 3/002 431/158 |
| 2007/0037107 A1 | * | 2/2007 | von Schweinitz | F23C 3/00 431/12 |
| 2014/0212824 A1 | * | 7/2014 | Huang | F23N 5/242 431/79 |
| 2016/0033135 A1 | * | 2/2016 | Chen | F23R 3/286 60/776 |
| 2016/0223196 A1 | * | 8/2016 | Tuttle | F23D 11/24 |

FOREIGN PATENT DOCUMENTS

| | | | | |
|---|---|---|---|---|
| DE | 4002570 A1 | | 8/1991 | |
| DE | 19824719 A1 | | 12/1999 | |
| DE | 19903767 C2 | | 5/2001 | |
| EP | 0078876 A1 | * | 5/1983 | ............... F23C 7/06 |
| EP | 0369950 A2 | * | 5/1990 | ............... F23C 7/00 |
| JP | 53069336 A | * | 6/1978 | ........... B60H 1/2203 |
| JP | 02182531 A | * | 7/1990 | ........... F23M 20/005 |
| JP | 04359704 A | * | 12/1992 | |
| JP | 08258542 A | * | 10/1996 | ............. F24H 1/263 |
| JP | 08327022 A | * | 12/1996 | |
| JP | 5525021 B2 | * | 6/2014 | ........... F23D 11/404 |
| RU | 2260516 C2 | | 9/2005 | |
| WO | WO-02070292 A1 | * | 9/2002 | ........... B60H 1/2203 |

* cited by examiner

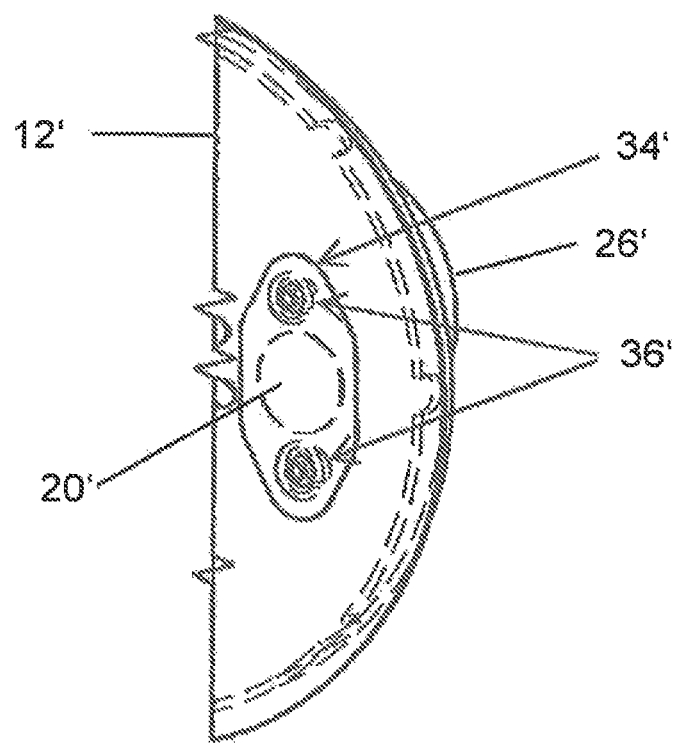

BURNER AND VEHICLE HEATER

CROSS-REFERENCE TO RELATED APPLICATIONS

This application represents the national stage entry of PCT International Application No. PCT/EP2017/068127 filed on Jul. 18, 2017, which claims the benefit of German Patent Application No. 10 2016 113 222.5 filed on Jul. 18, 2016, the entire contents of which are incorporated herein by reference for all purposes.

The invention relates to a burner, in particular for vehicle heaters, with a flexible diaphragm which separates an inner combustion region from an outer region, wherein a light-sensitive sensor for flame detection is arranged in the outer region, and wherein the flexible diaphragm exhibits at least one light aperture which enables a passage of light from the inner combustion region into the outer region.

The invention further relates to a vehicle heater.

Nowadays motor vehicles are widely equipped with vehicle heaters which serve, in particular, as engine-independent heating systems and/or auxiliary heaters. In most cases it is also possible to retrofit vehicle heaters in motor vehicles. Heaters of such a type also find application in other environments, for instance in boats, motor homes or other mobile or stationary domains. In particular in the case of motor vehicles, the same fuel is burned in the vehicle heater that is also utilized in the course of the combustion in the operating engine—that is to say, in particular, diesel fuel or gasoline. This fuel, which is available in liquid form in the vehicle, has to be converted into the gaseous state of matter for the purpose of combustion. For this purpose, the principles of atomization and/or vaporization, above all, are made use of. In atomizer burners a nozzle is provided, by means of which the fuel is firstly converted into droplet form, in order then to pass over into the gaseous state by reason of the thermal energy that is present in the vehicle heater. The oxidizing agent that is required for the combustion is supplied, in the form of a stream of combustion air, to the combustion region in the vehicle heater. In many cases, a device for flame detection is also assigned to the burners of the vehicle heaters. In this connection it is a question of a sensor, of whatever type, that detects the presence of a flame in the burner and relays a corresponding signal to a control unit of the vehicle heater. Depending on this signal, the control parameters of the vehicle heater are set, for instance in the sense of a modification of the operation of the burner after successful ignition of the burner or in the event of an intentional or unintentional extinguishing of the flame, in which case in particular an interruption of the fuel supply then occurs.

An example of a nozzle-type burner pertaining to the prior art is shown in FIG. 2 in a partially cut-away representation. FIG. 3 represents a detail of this nozzle-type burner. The burner 10' exhibits an inner combustion region 14' which is bounded by a funnel-shaped wall 26'. The inner combustion region 14' substantially comprises the actual combustion chamber and also the openly adjoining region within the funnel-shaped wall 26', which contributes significantly to the formation of a mixture. The funnel-shaped wall 26' is shown partially cut away in this illustration. By thus means, a view into the inner combustion region 14' is granted. A nozzle 24' can be discerned, to which fuel can be supplied. In operation of the burner 10' the fuel emerges from a nozzle aperture 28' and in this way is supplied for vaporization and ultimate combustion. The inner combustion region 14' is furthermore bounded by a flexible diaphragm 12' which here is represented in truncated form, said flexible diaphragm 12' having a substantially circular-disk-like shape. An edge 30' of the funnel-shaped wall 26' is seated on the flexible diaphragm 12'. As a result of the interaction of the funnel-shaped wall 26' and the flexible diaphragm 12', in this way the inner combustion region 14" is delimited to a greater extent. A flexible diaphragm 12' in the sense of the present technical teaching is a diaphragm that, particularly in the course of assembly of the burner, is mechanically readily deformable elastically or plastically. The flexibility of the diaphragm allows a tolerance compensation, at least within the bounds of the existing manufacturing-conditioned dimensional inaccuracy even over many thermal cycles of the burner, in particular an avoidance of undesirable gaps in the contact region between the flexible diaphragm 12' and the funnel-shaped wall 26'. Starting from the diaphragm 12', the funnel-shaped wall 26' tapers, and on its side facing away from the flexible diaphragm 12' it has an aperture 32', in order to permit here the distribution of fuel and combustion air and also the formation of a flame in the more extensive combustion chamber. Fuel is supplied to the nozzle via a line, not represented here, which passes through the flexible diaphragm 12' from the side of the flexible diaphragm 12' facing away from the nozzle 24'. The combustion air that is required for the combustion is supplied to the inner combustion region 14' via apertures 22'. These apertures are formed in the edge 30' of the funnel-shaped wall 26' and are U-shaped. By virtue of the seating of the edge 30' of the funnel-shaped wall 26' on the flexible diaphragm 12', the apertures 22' ultimately defined. The flexibility of the flexible diaphragm 12' ensures a defined size of the aperture 22' even in the presence of the conventional manufacturing tolerances, and avoids undesirable gaps between the flexible diaphragm 12' and the funnel-shaped wall, even over many thermal cycles of the burner. The flexible diaphragm 12' itself exhibits a light aperture 20' which, for instance, has a diameter of 12 mm. By this means, light can emerge from the inner combustion region 14' into an outer region 16' of the burner 10', The outer region 16' includes the spatial region adjoining the inner combustion region 14', in which no combustion and no contribution to the formation of a mixture occur. This light reaches a light-sensitive sensor, for instance a photodiode, which is arranged in the outer region 16' of the burner 10' and which serves for flame detection. In order that the combustion air passes from the outer region 16' into the inner combustion region 14' in defined manner through the apertures 22' provided for it in the funnel-shaped wall 26', the light aperture 20' is covered with a mica disk 34', Said disk is fastened with two rivets 36' to the side of the flexible diaphragm 12' facing away from the nozzle 24'. FIG. 3 makes possible a view of the flexible diaphragm 12' from the side of the flexible diaphragm 12' facing away from the nozzle 24' and from the funnel-shaped wall 26'. Here the mica disk 34' fastened to the flexible diaphragm 12' by the rivets 36' can be fully discerned, covering the light aperture 20'.

The nozzle-type burner constructed in this way operates reliably in itself. By virtue of the apertures 22' in the funnel-shaped wall 26', a supply of combustion air occurs which can be adjusted well via the arrangement and size of the apertures 22', and the mica disk 34' prevents an ingress of incorrect air through the large light aperture of the flexible diaphragm 12' from the outer region 16' into the inner combustion region 14'. Nevertheless, a sensor arranged in the outer region can reliably register the presence of a flame. In order, furthermore, to ensure a defined supply of combustion air in the radial direction, the diaphragm 12' is flexible, because tolerances can be compensated by this means. Accordingly, combustion air actually enters only through the apertures 22' and not at other regions of the edge 30' of the funnel-shaped wall 26'.

Residues—such as soot or unburned fuel, for example—arise in the course of the operation of a burner. These residues may become deposited on the mica disk over the service life, as a result of which the flame detection by the light-sensitive sensor is impaired. In extreme cases, the mica disk may even become optically impervious, so that no flame detection at all can take place any longer. Therefore regular maintenance of this burner is required, in order to check the mica disk for its permeability to light, and in order to clean it if necessary. Furthermore it is to be noted that the flexibility of the diaphragm is locally impaired by the introduction of the mica disk (for example, fastened with rivets). As a result of this, a deficient tolerance compensation may occasionally occur, so that, in particular, temperature-conditioned material expansions can no longer be compensated by the flexibility of the diaphragm. Consequently, the penetration of incorrect air may then yet occur at the edge of the funnel-shaped wall, remote from the apertures provided for the actual intake of air. Likewise, the sealing action of the mica disk on the flexible diaphragm may be partially lost, in particular as a result of temperature effects.

The object underlying the invention is to eliminate the disadvantages, described above, of the burner pertaining to the prior art. In particular, a maintenance-free burner is desirable in which a reliable flame detection can always take place, and in which a penetration of "incorrect air" into the inner combustion region is precluded.

This object is achieved with the features of the independent claim.

Advantageous embodiments of the invention are specified in the dependent claims.

The invention builds upon the generic burner, in that the light aperture is provided to enable also a passage of combustion air from the outer region into the inner combustion region. Expressed otherwise, the mica disk, provision of which is mandatory in the burner pertaining to the prior art, is dispensed with entirely. Hence all the disadvantages that arise as a result of the fastening of the mica disk and as a result of the requirement for maintenance by reason of the mica disk are eliminated. By the light aperture being taken into consideration in the design of the supply of combustion air, the light aperture can be integrated into at least one of the combustion-air apertures.

The invention may provide that the light aperture is circular or slot-shaped or crescent-shaped or elliptical. Accordingly, there is relative freedom as regards the shaping of the light aperture, so the light aperture can be optimally adapted to the fluid-mechanical and optical requirements. In particular, the size or shape of the available mica disks no longer has to be taken into consideration in any way in connection with the shaping of the light aperture.

The invention usefully provides that at least one further aperture is provided in the flexible diaphragm, which enables a passage of combustion air from the outer region into the inner combustion region. Accordingly, in the flexible diaphragm a hole pattern is provided overall which enables an optimal supply of combustion air. The combustion air flows axially from the outer region into the inner combustion region. The light aperture may be an equally-ranked member of the hole pattern, particularly as far as size and arrangement are concerned, or it may differ in these respects from the other apertures.

The invention is developed further in particularly advantageous manner by virtue of the fact that the light-sensitive sensor is aligned with respect to the at least one light aperture. On the one hand, the light aperture may be an aperture that does not differ at all from any other apertures in the diaphragm. Accordingly, the light-sensitive sensor simply has to be arranged behind any aperture that has been provided in the diaphragm. However, it may be advantageous to design the light aperture in a special way—for instance, to make it larger than the other apertures in the flexible diaphragm—and to arrange the sensor behind precisely this aperture. By this means, the sensitivity and the reliability of the flame detection are optimized. Consequently, direct light and scattered light impinge on the light sensor.

The burner according to the invention is preferentially designed in such a manner that the flexible diaphragm enables a passage of fuel from the outer region into the inner combustion region, said fuel being capable of being supplied to a nozzle arranged in the inner combustion region, and that the inner combustion region is bounded by a funnel-shaped wall that tapers away from the flexible diaphragm. Accordingly, working may proceed in principle with a burner that, as regards its outer shape, barely differs from the burner pertaining to the prior art. In particular, use may be made of a funnel-shaped wall that tapers, starting from the flexible diaphragm, so that no changes, or barely any changes, have to be made to the funnel-shaped wall. Furthermore, the supply of fuel through the flexible diaphragm can also be undertaken in the same way as is known from the prior art.

However, it may be useful if the funnel-shaped wall exhibits no apertures for a passage of combustion air. This represents a minor modification of the funnel-shaped wall in relation to the prior art, but one which can be produced easily: the U-shaped recesses on the funnel-shaped wall are simply omitted. Ultimately the entire process for production of the burner is consequently simplified. The operation of the burner also becomes more readily comprehensible, since now no mixture of radially and axially entering combustion air any longer obtains. The entire supply of combustion air can be adjusted on the basis of the hole pattern in the flexible diaphragm, so that particularly simple conditions as regards fluid mechanics obtain, with only axial intake of combustion air.

The invention will now be elucidated in exemplary manner with reference to the accompanying drawings on the basis on a particularly preferred embodiment.

FIG. 3 shows a detail of the burner according to the prior art.

Figure 2:
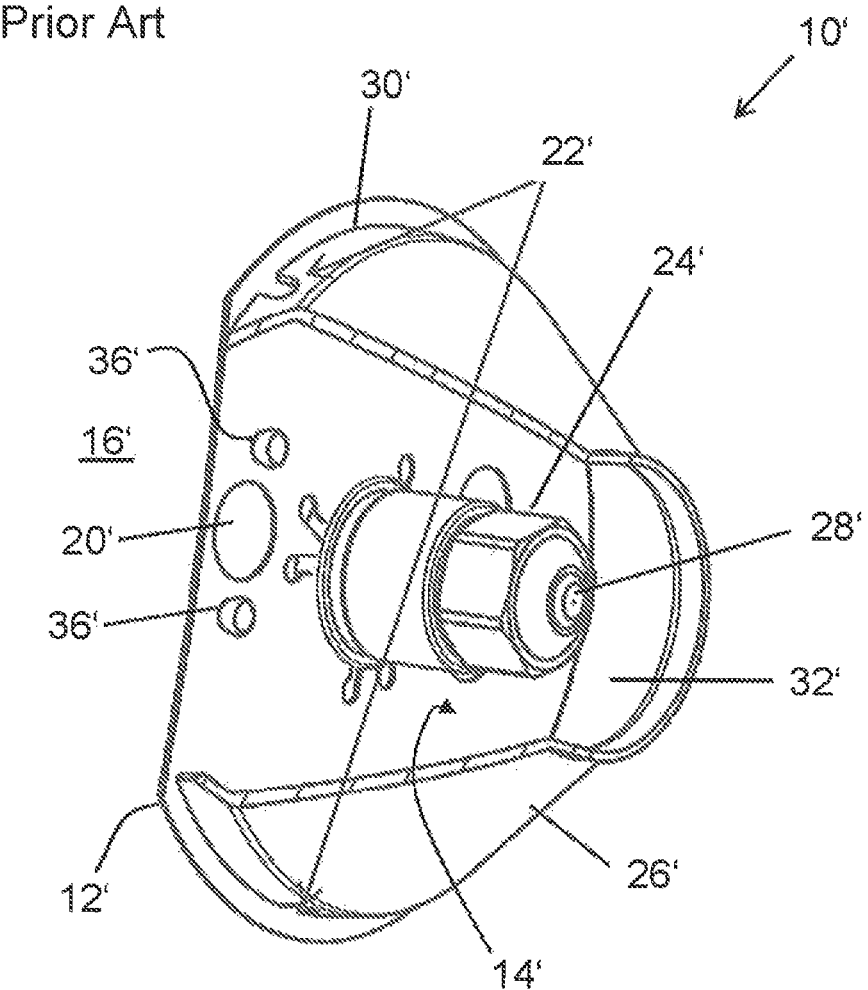
FIG. 2 shows a burner pertaining to the prior art in partially cut-away representation.

In the following description of the preferred embodiment, use is made of reference symbols that are associated with the reference symbols that were used in the above description of the prior art with reference to FIGS. 2 and 3. For instance, if reference numeral 30' was used for the edge of the funnel-shaped wall in connection with the prior art, reference numeral 30 will be found at this point in the following. By this means, the burner according to the invention and the further development thereof in comparison with the prior art can be described clearly.

Figure 1:
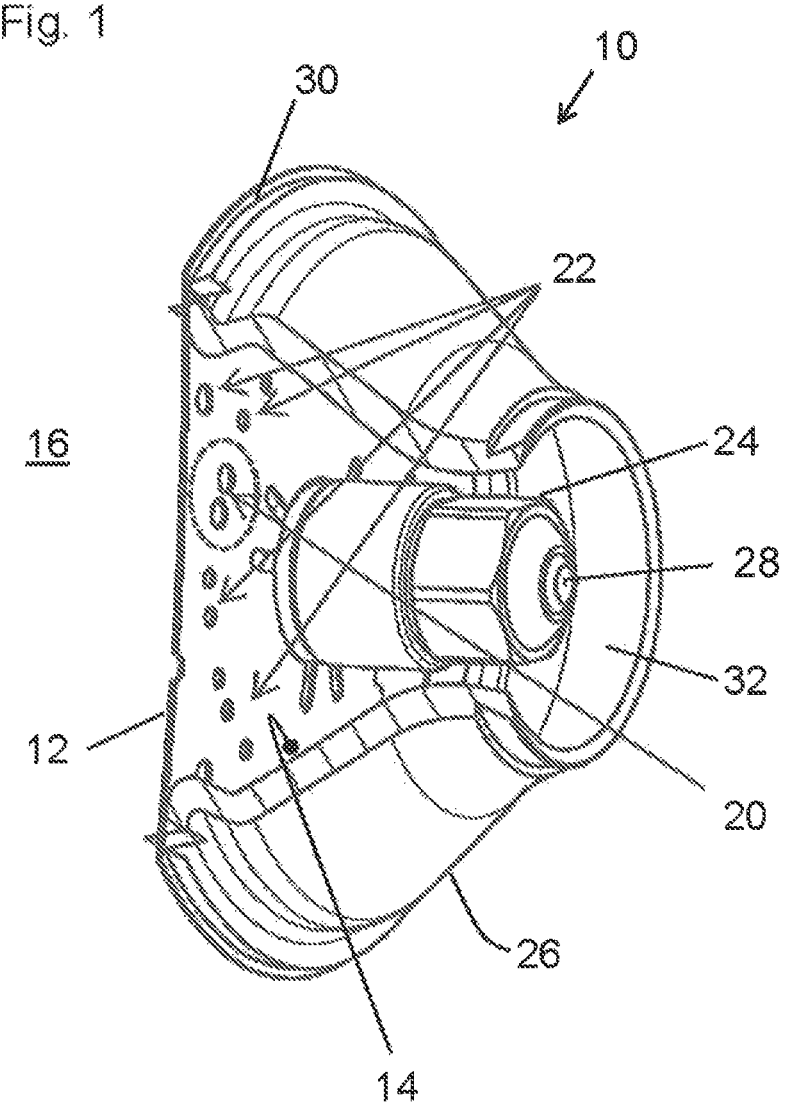
FIG. 1 shows a burner according to the invention in a partially cut-away representation.

FIG. 1 shows a burner 10 according to the invention in a partially cut-away representation. The burner 10 exhibits a flexible diaphragm 12 and a funnel-shaped wall 26. The funnel-shaped wall has been represented partially cut away, in order to reveal the view into the inner combustion region 14 of the burner 10. Corresponding to the cut surfaces on the funnel-shaped wall 26, the flexible diaphragm 12 is shown in truncated form. The nozzle 24 with the nozzle aperture 28 can be discerned in the inner region of the funnel-shaped wall 26. The edge 30 of the funnel-shaped wall 26 is seated on the flexible diaphragm 12 over the full perimeter. A flexible diaphragm 12 in the sense of the present technical teaching is a diaphragm that, particularly in the course of assembly of the burner, is mechanically readily deformable elastically or plastically. The flexibility of the diaphragm also allows a tolerance compensation, at least within the bounds of the existing manufacturing-conditioned dimensional inaccuracies, over many thermal cycles of the burner, in particular an avoidance of undesirable gaps in the contact region between the flexible diaphragm 12 and the funnel-shaped wall 26. Starting from the flexible diaphragm 12, the funnel-shaped wall 26 tapers as far as an aperture 32 into which the fuel is atomized, the combustion chamber following more extensively thereafter. In particular, the funnel-shaped wall 26 no longer has any U-shaped apertures on its edge 30, so that no radial intake of combustion air into the inner combustion region 14 takes place, unlike in the case of the prior art. However, a hole pattern which consists of a plurality of apertures 20, 22 is provided in the diaphragm 12. These apertures enable an axial intake of combustion air from the outer region 16 of the burner 10 into the inner combustion region 14. The inner combustion region 14 substantially comprises the actual combustion chamber and also the openly adjoining region within the funnel-shaped wall 26, which contributes significantly to the formation of a mixture. The outer region 16 includes the spatial region adjoining the inner combustion region 14, in which no combustion and no contribution to the formation of a mixture occur. Two of the apertures 20, 22, namely the apertures labeled by reference numeral 20, assume a special role. This is because a light sensor, aligned with these light apertures 20, is arranged in the outer region 16, said sensor having an unimpaired view into the inner combustion region 14. In particular, no mica disk is provided which might go dull or become sooted up. As a result, the burner 10 according to the invention is maintenance-free. Furthermore, by virtue of the absence of a rigid mica disk, the flexibility of the flexible diaphragm 12 is no longer impaired in any way. Consequently the flexible diaphragm always closes tightly against the edge 30 of the funnel-shaped wall 26, even in the event of great fluctuations in temperature. If the light sensor has not been aligned with special apertures, and/or if the light apertures do not differ at all from other apertures, the light sensor substantially reacts to scattered light.

The features of the invention disclosed in the foregoing description, in the drawings and also in the claims may be essential for the realization of the invention, both individually and in any combination.

LIST OF REFERENCE SYMBOLS 10, 10' burner
12, 12' flexible diaphragm
14, 14' Inner combustion region
16, 16' outer region of the burner
20, 20' light aperture
22, 22' aperture
24, 24' nozzle
26, 26' funnel-shaped wall
28, 28' nozzle aperture
30, 30' edge
32, 32' aperture
34' mica disc
36' rivet

The invention claimed is:

1. A burner, in particular for vehicle heaters, with a flexible diaphragm which separates an inner combustion region from an outer region, wherein mixing and burning of fuel and combustion air occurs in the inner combustion region while fuel and combustion air are kept separately within the outer region, wherein a light-sensitive sensor for flame detection is arranged in the outer region, and wherein the diaphragm exhibits at least one light aperture which enables a passage of light from the inner combustion region into the outer region, wherein the aperture is provided to enable also a passage of combustion air from the outer region into the inner combustion region.

2. The burner as claimed in claim 1, wherein the light aperture is circular or slot-shaped or sickle-shaped or elliptical.

3. The burner as claimed in claim 1, wherein at least one further aperture is provided in the diaphragm, which enables a passage of combustion air from the outer region into the inner combustion region.

4. The burner as claimed in claim 1, wherein the light-sensitive sensor is aligned with respect to the at least one light aperture.

5. The burner as claimed in claim 1, wherein the flexible diaphragm enables a passage of fuel from the outer region into the inner combustion region, said fuel being capable of being supplied to a nozzle arranged in the inner combustion region, and in that the inner combustion region is bounded by a funnel-shaped wall which tapers away from the flexible diaphragm.

6. The burner as claimed in claim 5, wherein the funnel-shaped wall exhibits no apertures for a passage of combustion air.

7. A vehicle heater with a burner as claimed in claim 1.

8. The burner as claimed in claim 1, wherein the diaphragm is flexible.

* * * * *

UNITED STATES PATENT AND TRADEMARK OFFICE
CERTIFICATE OF CORRECTION

| | |
|---|---|
| PATENT NO. | : 11,052,729 B2 |
| APPLICATION NO. | : 16/317611 |
| DATED | : July 6, 2021 |
| INVENTOR(S) | : Peter Neidenberger et al. |

Page 1 of 1

It is certified that error appears in the above-identified patent and that said Letters Patent is hereby corrected as shown below:

In the Claims

Column 6, Claim 1, Line 19-20, "a flexible diaphragm" should be -- a diaphragm --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*